Figure 1:
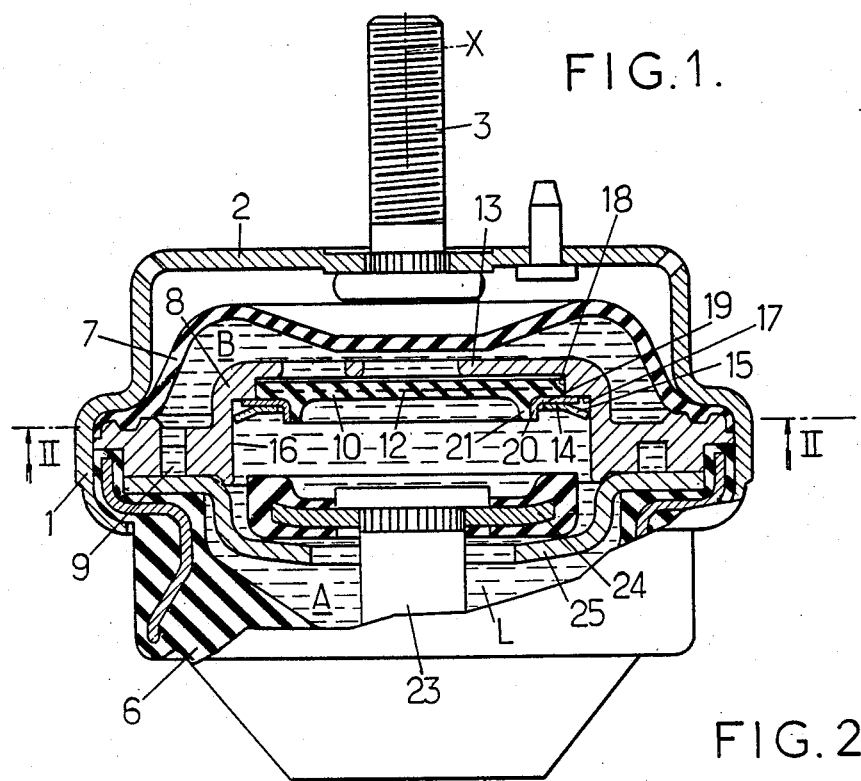

United States Patent [19]

Jouadé

[11] Patent Number: 4,921,201
[45] Date of Patent: May 1, 1990

[54] HYDRAULIC ANTIVIBRATORY SUPPORTS

[75] Inventor: Pierre Jouadé, Chateaudun, France

[73] Assignee: Hutchinson, France

[21] Appl. No.: 227,299

[22] Filed: Aug. 2, 1988

[30] Foreign Application Priority Data

Aug. 3, 1987 [FR] France .................... 87 11002

[51] Int. Cl.⁵ .................................. F16M 13/00
[52] U.S. Cl. .......................... 248/562; 248/636; 248/638; 267/140.1
[58] Field of Search .............. 248/636, 638, 659, 562, 248/565; 267/140.1; 411/508, 913, 528, 526, 525

[56] References Cited

U.S. PATENT DOCUMENTS

| | | | |
|---|---|---|---|
| 3,252,494 | 5/1966 | Schlage | 411/913 X |
| 4,607,828 | 8/1986 | Bodin | 267/140.1 |
| 4,612,501 | 9/1986 | Costello | 411/525 X |
| 4,621,795 | 11/1986 | Eberhard | 248/636 X |
| 4,647,023 | 3/1987 | Ray | 267/140.1 X |
| 4,711,206 | 12/1987 | Andra | 248/636 X |
| 4,721,292 | 1/1988 | Saito | 248/562 X |
| 4,773,634 | 9/1988 | Hamaekers | 267/140.1 X |
| 4,809,959 | 3/1989 | Hourlier | 248/565 X |
| 4,810,144 | 3/1989 | Martelli | 411/508 X |

Primary Examiner—J. Franklin Foss
Attorney, Agent, or Firm—Larson and Taylor

[57] ABSTRACT

In an antivibratory support intended to be interposed between a vehicle chassis and an internal combustion engine, which support comprises a work chamber (A) and a compensation chamber (B) filled with a liquid (L), joined together by a restricted passage (9) and separated from each other by a dividing wall (8) equipped with a deformable or mobile valve (10), this valve is mounted on its seat (13) by means of a metal washer (14, 15) bearing radially with a buttressing effect against an internal cylindrical face (16) integral with the seat (13), said washer being formed by a flat ring (14) extended outwards by a circle of lugs (15) extending in the form of a truncated cone.

7 Claims, 1 Drawing Sheet

HYDRAULIC ANTIVIBRATORY SUPPORTS

The invention relates to antivibratory devices intended to be fitted for support and damping purposes between two rigid elements individually subjected to certain oscillations and/or vibrations, the damping causing a liquid to be driven through a restricted passage at least under certain operating conditions.

By way of non limitative example, such supports may be mounted between a vehicle chassis and the internal combustion engine of this vehicle for damping not only the "hash" oscillations imposed on the chassis by the unevenness and vibrations of slope of the ground when the vehicle is travelling over such ground but also vibrations due to the operation of the engine, particularly when idling.

The invention relates more particularly, among the supports of the kind is question, to those which are formed by a sealed case interposed between the two rigid elements, which case comprises a rigid base able to be fixed to one of the two rigid elements, a rigid ring able to be fixed to the other rigid element, a resilient annular support wall sealingly connecting the base to the ring and a flexible membrane joined sealingly to the ring, the inside of this case being divided, by a dividing wall connected to the ring between the annular wall and the membrane, into two chambers, namely a work chamber on the annular wall side and a compensation chamber on the membrane side, these two chambers communicating with each other permanently through the above restricted passage and a liquid mass filling the two chambers as well as the restricted passage.

The invention relates more particularly still to the case where the intermediate dividing wall comprises a deformable or mobile portion forming a floating "valve" and means for limiting the amplitude of the movements of this valve to a low value, preferably less than 0.5 mm.

With such a support, the oscillations or vibrations created between the two rigid elements result in moving these two elements in turn towards and away from each other axially.

Those of these oscillations called "hash" or "chopping" which has a relatively low frequency (less than 20 Hz) and a relatively high amplitude (greater than 0.5 mm), result in driving the liquid from one of the two chambers into the other through the restricted passage and conversely and, for a given value of said frequency depending essentially on the dimensions of said restricted passage, high damping of the oscillations considered can be observed because of the resonance effect of the liquid mass flowing through this passage.

Those of said oscillations which have a relatively high frequency (greater than 20 Hz) and a relatively low amplitude (less than 0.5 mm) result in corresponding oscillations of the valve without there being veritable transfer of liquid through the restricted passage, which results in filtering the transmission of the oscillations considered from the rigid element where they are generated to the other rigid element.

To simplify, it will be assumed in what follows that the assembly comprising the support and the valve is of revolution about a vertical or substantially vertical axis.

But this assumption is only envisaged by way of simplification; the invention does not exclude the case where the support and/or the valve have forms which are not of revolution.

In known embodiments of the above described supports, the periphery of the valve is generally surrounded axially, with or without clearance, by two rigid surfaces themselves forming part of two separate annular pieces clamped axially by crimping against each other and at the same time against the rigid ring and against the edges of the annular wall and of the membrane.

This method of fitting imposes certain conditions because in particular the outer diameter of the valve may be very much less than that of the other annular pieces to be assembled together mutually by crimping.

In one embodiment in which the valve was formed by a sealed deformable membrane mounted sealingly on its seat, it has been proposed to adhere one face of the periphery of this membrane to the rigid annular surface forming said seat whereas the other face, of this periphery, carried a rigid ring adhered thereto so as to be able to float freely.

This construction is interesting, but fixing by adherence is not always easy to accomplish nor to maintain in time.

The object of the invention is especially to overcome these different drawbacks.

For this, the antivibratory supports of the invention still comprise two rigid bearing surfaces surrounding the periphery of the valve axially and they are essentially characterized in that one of these two rigid surfaces is formed by a metal washer bearing radially against an internal cylindrical face of a rigid annular piece fast with the other bearing surface, said washer being formed by a flat ring extended outwardly by a circle of lugs extending substantially in the form of a truncated cone and dimensioned so that contact between these lugs and the cylindrical opposite face causes slight bending thereof and a buttressing effect.

In further embodiments, recourse is further had to one and/or other of the following arrangements:

the other bearing surface forms part of the rigid annular piece against an internal cylindrical face of which the washer bears, the metal washer forms the periphery of a perforated disk.

The invention comprises, apart from these main arrangements, certain other arrangements which are preferably used at the same time and which will be more explicitly discussed hereafter.

In what follows several preferred embodiments of the invention will be described with reference to the accompanying drawings in a way which is of course in no wise limitative.

Figure 2:
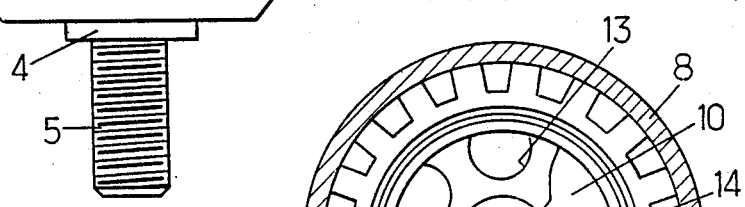
Figure 3:
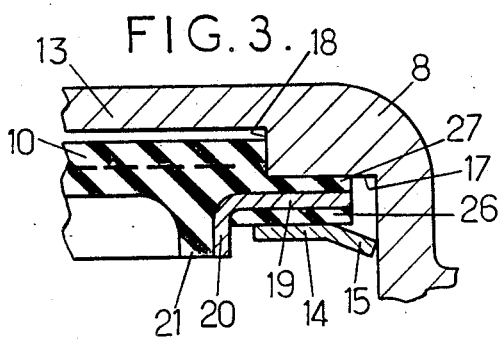
Figure 4:
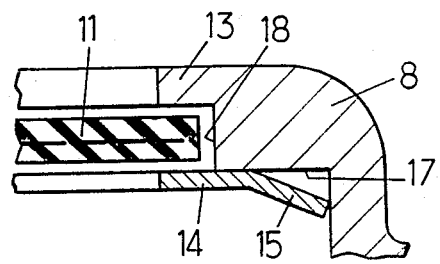

FIG. 1 of these drawings shows in elevation, with a portion in axial section, an antivibratory support constructed in accordance with the invention, FIG. 2 shows the central portion of this support in cross section through II—II of FIG. 1, and FIGS. 3 and 4 show in partial axial sections two variants of antivibratory supports constructed in accordance with the invention.

In each case, the support considered is intended to be interposed vertically or in a direction slightly tilted with respect to the vertical between a rigid carrier member and a rigid supported member: in a preferred application which will be used for the following description, the carrier member is a vehicle chassis and the supported member the internal combustion engine of this vehicle.

The terms "high, low upper, lower, cup" are used in the following description by way of non limitative example for the support described may perfectly well be used in the reverse of the direction adopted for this description.

The support has the general shape of a sealed case of revolution about an axis X comprising:

a rigid ring 1 formed by the edge of an upturned metal cup 2, itself able to support the engine by means of a stud bolt 3 whose threaded shank, extending upwards, passes through the centre of said cup, a lower base 4 itself solid with a stud bolt 5 whose threaded shank, extending downwards, is able to cooperate with a nut for fixing this base to the vehicle chassis, a lower resilient wall 6 sufficiently thick to transmit the loads of the engine to the chassis, which wall is essentially defined by two truncated cone shaped surfaces widening out upwards and whose small base, disposed at the bottom, is adhered to the base 4; its large upper base being connected sealingly to ring 1, and an upper sealing and flexible membrane 7 contained inside cup 2, the edge of this membrane being fixed sealingly to ring 1.

An intermediate dividing wall 8 divides the inside of the case thus formed into two chambers, namely a lower work chamber A and an upper compensation or balancing chamber B.

The periphery of dividing wall 8 is for this purpose connected sealingly to ring 1, between the thick wall 6 and membrane 7.

A restricted passage 9 causes the two chambers A and B to communicate permanently with each other.

This passage 9 is here formed by at least one curved channel extending along an arc of a circle about the axis X, which channel is formed in the periphery of dividing wall 8.

The central portion of this dividing wall 8 is formed by a rigid disk 10 or 11 forming a valve, namely mounting so as to be able to move in the direction of axis X.

The periphery of this valve may be connected sealingly to the rest of the dividing wall 8 by a deformable foil portion: this is the case for valve 10 illustrated in FIGS. 1 and 3.

But it is not the case for the variant, which will be described further on with reference to FIG. 4, in which valve 11 is movable between two rigid surfaces.

In each case, the amplitudes of the free axial movements of the valve are limited to a low value, of the order of 0.5 mm: for this, a reinforcement 12 may be incorporated in valve 10 in the case of the deformable foil; in the other cases, these limitations are often obtained by abutment of the valve against grids or perforated plates whose above bearing surfaces form the peripheries.

A liquid mass L fills chambers A and B as well as channel 9, and valve 10, 11 is immersed in this liquid mass.

As is well known, the existence of this valve makes it possible to filter the transmission of certain undesirable vibrations from one of the rigid elements to the other, because of the movements then imposed on this valve by these undesirable vibrations.

The invention proposes simplifying the mounting of said valve.

Such mounting is provided by imprisoning the valve axially between:

on one hand a first rigid bearing surface 13 which is comprised in a way known per se by the rigid portion of the intermediate dividing wall 8, which bearing surface is formed more especially by a grid or perforated plate, and on the other hand by a flat washer 14 extended outwardly by a circle of lugs 15 extending in the form of a truncated cone or similar and bearing with axial buttressing effect against an internal cylindrical face 16 forming part of the rigid portion of dividing wall 8.

The conicity of the circle of lugs 15 is oriented so that these lugs extend axially from the side of washer 14 opposite that where the valve is located.

To provide the buttressing effect, the outer diameter of the circle of lugs 15, before it is positioned, is given a value slightly greater than the diameter of the internal cylindrical face 16.

This face 16 is open axially downwards so as to be able to receive the washer 14,15 by simple axial sliding.

Its upper end is extended towards the axis X by a transverse annular zone 17 serving as axial end of travel stop for said washer and forming, with a cylindrical face 18 which surrounds the valve, an annular step which borders the surface 13 on the underside.

In the first embodiment illustrated in FIGS. 1 and 2, valve 10, formed by the central portion, made preferably rigid, of a slightly deformable foil carries a metal ring 19 adhered to the periphery of its lower face.

This ring 19 projects radially outwardly with respect to valve 10 so that it may be applied axially upwardly against step 17,18.

Said ring 19 is extended inwardly by a downward bent edge 20, which confers thereon a certain rigidity while facilitating relative centring between itself and washer 14, 15.

This edge 20 is itself skirted on the inside by a lower rib 21 integrally molded with valve 10.

Valve 10 is mounted on dividing wall 8 as follows:

Said valve is first of all positioned in the housing defined axially by bearing surface 13 and radially by the internal cylindrical face 18.

Then washer 14, 15 is placed against the dividing wall 8 by sliding it axially along face 16, using a slight force sufficient to slightly bend lugs 15, until there is abutment of said washer against ring 19 and abutment of this ring against step 17,18.

Mounting of valve 10 on dividing wall 8 is then finished and it is substantially irreversible because of the buttress engagement which is obtained between the edges of lugs 18 and the inner cylindrical face 16.

In FIG. 1 there can be further seen:

a foot 23 integral with base 4 and plunging into chamber A, which foot ends in a radially projecting shoe 24, and a reinforcement 25 also immersed in chamber A and adapted to surround foot 23 with a clearance, the diameter of the opening formed in this reinforcement 25 being less than that of shoe 24.

This measure, known per se, avoids destruction of the support by axial stripping, such an axial force resulting in the axial application of shoe 24 against reinforcement 25.

The variant illustrated in FIG. 3 differs from the preceding one solely by the face that resilient cushions are provided respectively:

at 26, between washer 14, 15 and ring 19, and at 27, between said ring 19 and the transverse bearing surface 17.

This construction provides a more flexible mounting of the valve on its seat.

Finally, in the other variant shown in FIG. 4, valve 11 is not connected sealingly to the rest of dividing wall 8, but may move freely in the axial direction between two rigid surfaces.

The first of these surfaces is formed as before by a perforated central portion 13 of dividing wall 8.

As for the second bearing surface, it is here formed directly by washer 14, 15, applied axially against the transverse annular zone 17.

Said washer 14, 15 may have a small radial width.

It may also be formed by the periphery of a perforated plate.

As is evident, and as it follows moreover already from what has gone before, the invention is in no wise limited to those of its modes of application and embodiments which have been more especially considered; it embraces, on the contrary, all variants thereof.

I claim:

1. An antivibratory device intended to be fitted for support and damping purposes between two rigid elements, formed by a sealed case comprising a rigid base able to be fixed to one of the two rigid elements, a rigid ring fixable to the other rigid element, a resilient annular support wall sealingly connecting the base to the ring and a flexible membrane connected sealingly to the ring, the inside of this case being divided by an intermediate dividing wall into two chambers, namely a work chamber on the annular wall side and a compensation chamber on the membrane side, these two chambers communicating with each other permanently through a restricted passage, a liquid mass filling the two chambers as well as the restricted passage, and the intermediate dividing wall comprising a floating valve, two rigid surfaces axially surrounding the periphery of the valve and complementary means for limiting the amplitude of the free movements of the valve, one of the two rigid surfaces being formed by a metal washer, bearing radially against an internal cylindrical face of a rigid annular piece secured to the other surface, said washer being formed by a flat ring extended outwardly by a circle of lugs extending substantially in the form of a truncated cone and dimensioned so that the contact between these lugs and the opposite cylindrical face causes a slight bending thereof and a buttressing effect and wherein said other surface forms part of the rigid annular piece against an internal cylindrical face against which the washer bears.

2. An antivibratory device according to claim 1, wherein the metal washer forms the periphery of a perforated disk.

3. An antivibratory device according to claim 1, wherein the valve is formed by a sealed deformable foil, the periphery of said valve being provided with a rigid ring against which the washer bears.

4. An antivibratory device according to claim 1, wherein said intermediate dividing wall forms a floating valve having a mobile portion.

5. An antivibratory device according to claim 1, wherein said intermediate dividing wall forms a floating valve having a deformable portion.

6. An antivibratory device according to claim 1, wherein said washer is a toothed washer comprising limitation means for limiting the amplitude of the valve movements by abutment of said valve against a central part of the perforated disk.

7. An antivibratory device according to claim 1, wherein said washer is a toothed washer comprising annular anchoring means for securing said dividing wall to an annular piece.

* * * * *